United States Patent
Patti

[11] Patent Number: 5,922,152
[45] Date of Patent: Jul. 13, 1999

[54] WHEEL BRACKET

[76] Inventor: Tony Patti, 13920 Mt. McClellan Blvd., Reno, Nev. 89506

[21] Appl. No.: 08/879,563

[22] Filed: Jun. 20, 1997

Related U.S. Application Data

[63] Continuation-in-part of application No. 08/348,599, Dec. 2, 1994.

[51] Int. Cl.$^6$ ............................ B60C 23/00; B60C 29/02; B60C 29/06
[52] U.S. Cl. ................................... 152/427; 152/DIG. 8; 152/DIG. 13
[58] Field of Search ................................... 152/427, 415, 152/DIG. 8, DIG. 13; 301/5.24; 137/223

[56] References Cited

U.S. PATENT DOCUMENTS

| | | | |
|---|---|---|---|
| 1,413,159 | 4/1922 | Darche | 152/427 X |
| 1,624,974 | 4/1927 | Putnam | 301/5.1 |
| 1,646,863 | 10/1927 | Hunt | 301/63.1 |
| 1,677,755 | 7/1928 | Forsyth | 301/22 |
| 2,631,065 | 3/1953 | Borodie | 301/5.24 |
| 2,966,320 | 12/1960 | Schoepe | 248/75 |
| 2,984,283 | 5/1961 | Ransom | 152/427 |
| 3,039,510 | 6/1962 | Cardi | 152/427 |
| 3,077,220 | 2/1963 | Fusco, Jr. | 152/427 |
| 3,106,953 | 10/1963 | Baxa | 152/427 |
| 3,939,894 | 2/1976 | Curtis | 152/427 |
| 5,313,997 | 5/1994 | Bias et al. | 152/427 |

*Primary Examiner*—Francis J. Lorin
*Attorney, Agent, or Firm*—Ian F. Burns

[57] ABSTRACT

A wheel bracket for holding a variety of objects, such as valve extenders and air hoses, in a desired position on a vehicle wheel rim. The wheel bracket comprises a first end for attaching to a wheel rim, a wheel portion for abutting a wheel rim and supporting a freestanding portion, and a second end. The freestanding portion may comprise an elbow and a straight portion for positioning the second end. The wheel bracket may be used with dual wheel assemblies and wheel covers. The wheel bracket or portions of it may be flexible and pliable to allow the wheel bracket to be adjusted to fit different wheels and allow the position of an attached object to be adjusted.

17 Claims, 3 Drawing Sheets

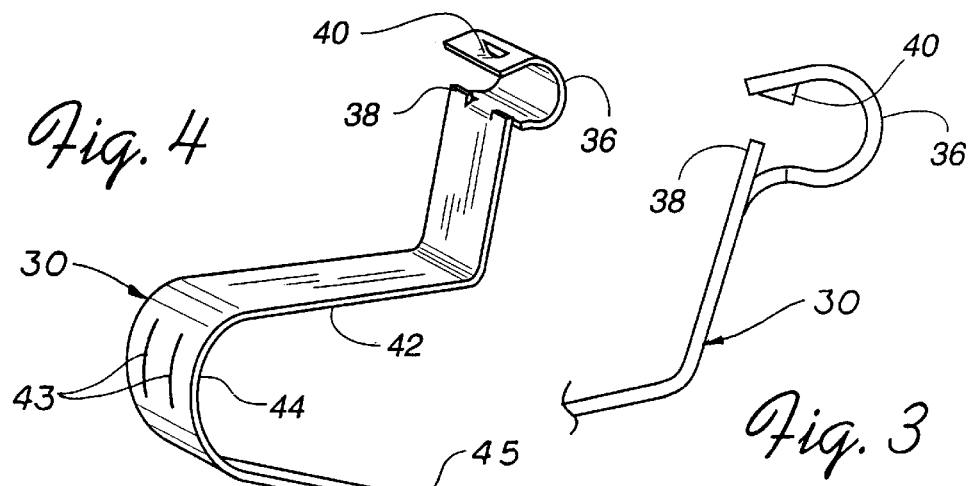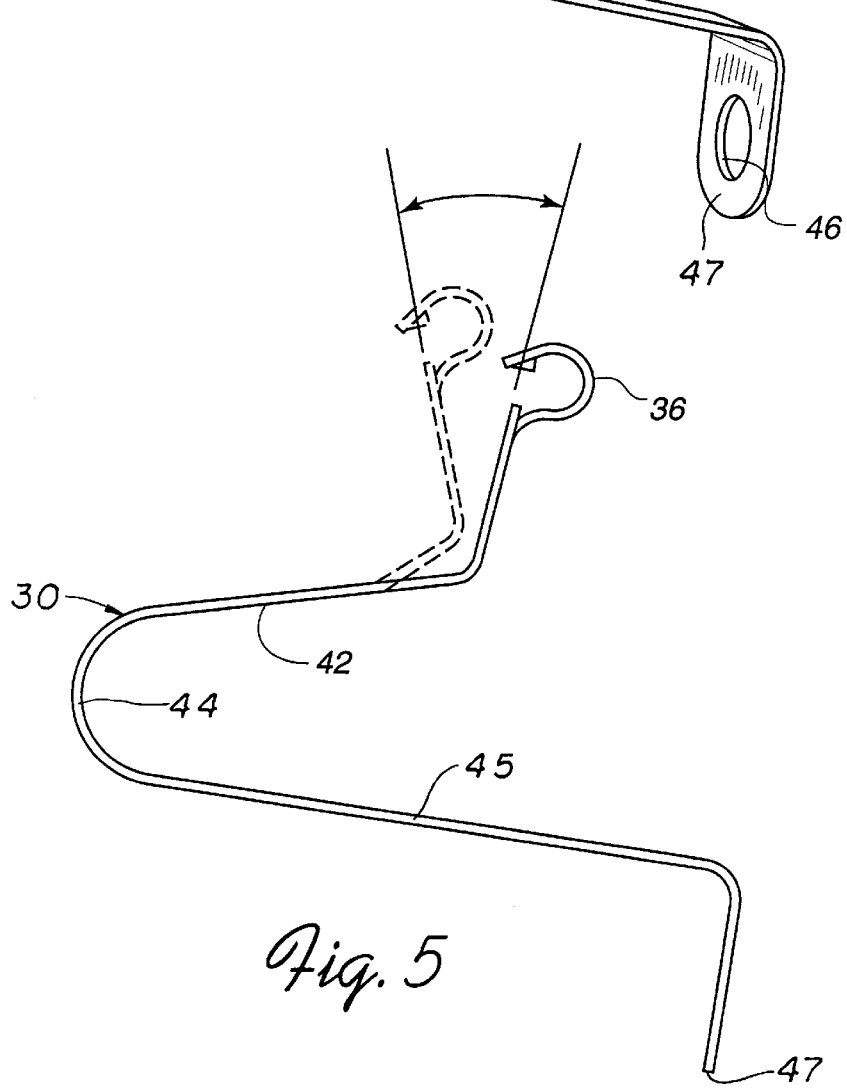

WHEEL BRACKET

CROSS REFERENCES TO RELATED APPLICATIONS

This application is a continuation in part of patent application Ser. No. 08/348,599 filed on Dec. 2, 1994.

BACKGROUND OF THE INVENTION

1. Field of Invention

This invention relates to a wheel bracket for holding and supporting objects on a vehicle wheel rim. The wheel bracket is particularly well adapted to hold valve extenders or air hoses used on large vehicle wheels.

2. Description of Related Art

Large vehicles often use dual wheels to support heavy loads and provide greater traction. Dual wheel assemblies comprise two wheels; an inner and outer wheel. Both wheels are connected together and the assembly is attached to an axle of a vehicle. One of the problems associated with dual wheels is that it is difficult to access the valve stem of the inner wheel. As is the case with most vehicles, it is important to be able to access the valve stems of dual wheels to monitor and adjust tire pressure. Because the inner wheel is underneath the vehicle and behind the outer wheel, the valve stem may be difficult for a user to reach. Hand holes or access holes may be provided in the dual wheel for allowing a user to reach through the wheels to the inner wheel valve stem. However, reaching through the wheels to check or adjust tire pressure is an inconvenient, dirty, and uncomfortable task.

A similar problem may be encountered when a wheel cover is used on any type of vehicle wheel. Wheel covers generally cover the entire outer surface of a wheel except for a small hole that is intended to allow access to a valve stem. However, it is often difficult to access the valve stem through this hole because wheel covers are generally designed to fit a large variety of wheel rims and, consequently, the valve stem may not be positioned to protrude through the hole.

To address these problems, air hoses and valve extenders have been developed to effectively extend the valve stems of both the inner and outer wheels. Valve extenders are well known in the art and they allow users to monitor and adjust tire pressure from a more convenient location.

Valve extenders must be anchored or held in place in order to prevent them from being damaged when the vehicle is in motion. If a valve extender is not anchored, it may flop around and become damaged or cause damage to the outer wheel or wheel cover. Valve extenders must also be anchored in order to be used with wheel covers. Valve extenders must be held in an appropriate location so that users can access the valve extenders through the wheel cover access holes. If the valve extenders are not properly positioned, it may be necessary to remove the wheel cover to access the extender; an inconvenient, dirty, and time consuming process.

It is also highly desirable for the valve extender to be supported in such a way that a user may press on the extender to operate the valve. Tire pressure gauges and compressed air hoses require the user to press on the valve extender to engage the extender and operate the air valve. Some extenders, gauges, and air hoses require the application of a considerable amount of force. If the valve extender is not supported to resist this force, the user may be unable to engage the extender.

SUMMARY OF INVENTION

1. Objects of the Invention

It is a primary objective of the present invention to provide a wheel bracket for holding objects in a relatively fixed position on a vehicle wheel rim.

It is a further object of the present invention to provide a wheel bracket that is inexpensive to manufacture.

It is another object of the present invention to provide a wheel bracket that is adapted to hold valve extenders and air hoses.

It is a further object of the present invention to provide a wheel bracket that may be used with wheel covers.

It is yet another object of the present invention to provide a wheel bracket that is flexible so that objects may be held in a variety of positions.

It is another objective of the present invention to provide a wheel bracket that abuts a surface of a wheel to provide support when the wheel is rotating.

It is a further objective of the present invention to provide a wheel bracket that is adapted to hold a valve extender or air hose and provides support when a user is testing air pressure or adjusting the amount of air in a tire.

It is yet another object of the present invention to provide a wheel bracket that is simple and may be easily installed and removed from a vehicle wheel.

These and other objects of the present invention may be realized by reference to the remaining portions of the specification, claims, and abstract.

2. Brief Description of the Invention

In accordance with the objects of the present invention, a wheel bracket is provided which is adapted to hold and support a variety of objects on a vehicle wheel. The wheel bracket comprises a first end for removably attaching the bracket to a vehicle wheel rim. The first end may comprise a substantially C-shaped cross section for wrapping around the edge of the wheel rim. The first end may also comprise teeth or barbs for providing friction and engaging the wheel rim. This prevents the bracket from accidentally disengaging.

The wheel bracket also comprises a wheel portion for supporting other portions of the wheel bracket. The wheel portion is adapted to abut a surface of a wheel so that when the wheel is rotating, the wheel portion will support the other portions of the bracket and the attached object. The wheel portion also supports the wheel bracket when force is being applied to the wheel bracket, such as when a user presses on a valve extender. The wheel portion may also be pliable to allow it to be shaped to fit a variety of different wheels.

The wheel bracket also comprises a freestanding portion that projects away from the vehicle wheel and is substantially freestanding. The freestanding portion may comprise an elbow portion and a straight portion. The elbow portion is attached to the wheel portion and may take a variety of shapes to position the remaining portions of the wheel bracket in desired locations. The elbow portion may also be flexible or pliable to allow objects to be held in a variety of positions. The straight portion is attached to the elbow portion and extends outwards to a desired position.

Finally, a second end is attached to the freestanding portion for holding a selected object. The second end may have a hole for receiving an object, such as an end portion of a valve extender or air hose.

The design of the wheel bracket allows a user to press upon objects attached to the wheel bracket and receive a counter resisting force. If a valve extender is attached to the wheel bracket, a user can press on the valve extender to check and adjust tire pressure. When the user presses on the valve extender, the user's force is transferred through the freestanding portion to the wheel portion and the first end. The wheel portion abuts the wheel and provides support.

The above description sets forth, rather broadly, the more important features of the present invention so that the detailed description that follows may be better understood and the contributions of the present invention to the art may be better appreciated. There are additional features of the invention that will be described below which will form the subject matter of claims appended hereto. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIG. 3 is substantially a side view of the first end of one embodiment of the wheel bracket of the present invention.

FIG. 4 is substantially a perspective view of one embodiment of the wheel bracket of the present invention.

FIG. 5 is substantially a side elevational view of one embodiment of the wheel bracket of the present invention.

Figure 1:
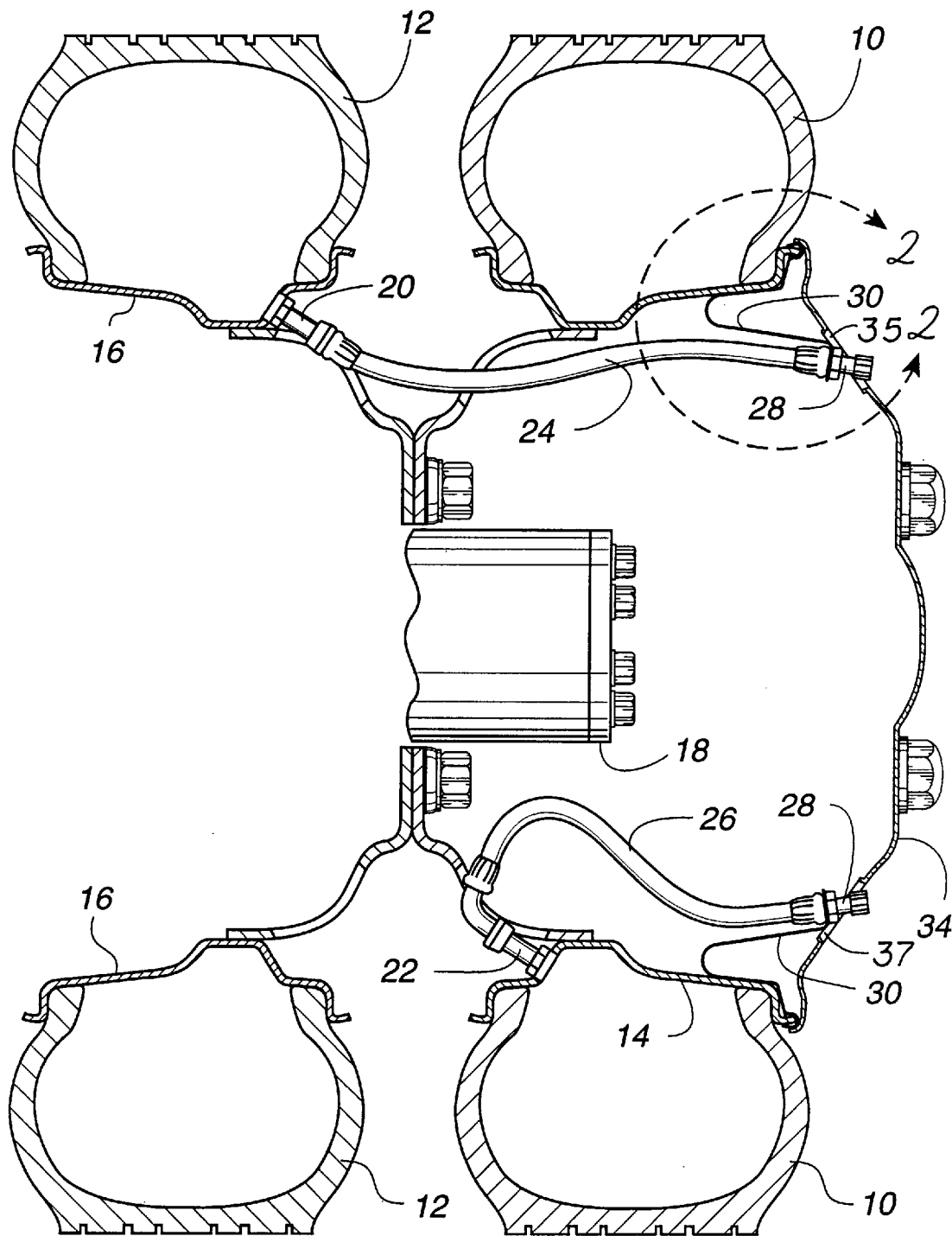
FIG. 1 is substantially a cross sectional view of a dual wheel assembly with a wheel cover and valve extenders in use with a wheel bracket of the present invention.

REFERENCE NUMERALS 10 tire
12 tire
14 outer wheel
16 inner wheel
18 hub
20 valve stem
22 valve stem
24 air valve extender
26 air valve extender
28 extender end
30 wheel bracket
32 wheel rim edge
34 wheel cover
35 hole
36 first end
37 hole
38 teeth
40 teeth
42 wheel portion
43 ridge
44 elbow
45 straight portion
46 hole
47 second end

DESCRIPTION OF THE PREFERRED EMBODIMENT

As seen in FIG. 1, a dual wheel assembly comprises tires 10 and 12, wheel rims 14 and 16, and valve stems 20 and 22. Valve extenders 24 and 26 are attached to valve stems 20 and 22, respectively. An axle (not shown) is attached to hub 18. A wheel cover 34 is attached to outer wheel 14. Wheel cover 34 substantially covers wheel 14 and it is attached to wheel rim 14 by any of a number of methods and devices that are well know in the art. Wheel covers are well known in the art and they are commonly used to protect and improve the appearance of vehicle wheels. Holes 35 and 37 are provided on wheel cover 34 for allowing access to valve extenders 24 and 26, respectively. Two wheel brackets 30 of the present invention are provided for holding and supporting valve extenders 24 and 26. Ends 28 of valve extenders 24 and 26 are held in a position where a user may easily access the ends to check and adjust tire pressure. Although FIG. 1 demonstrates the use of the present invention with a dual wheel and wheel cover, it is recognized that the present invention may also be used without a wheel cover and on single (non-dual) wheels.

Figure 2:
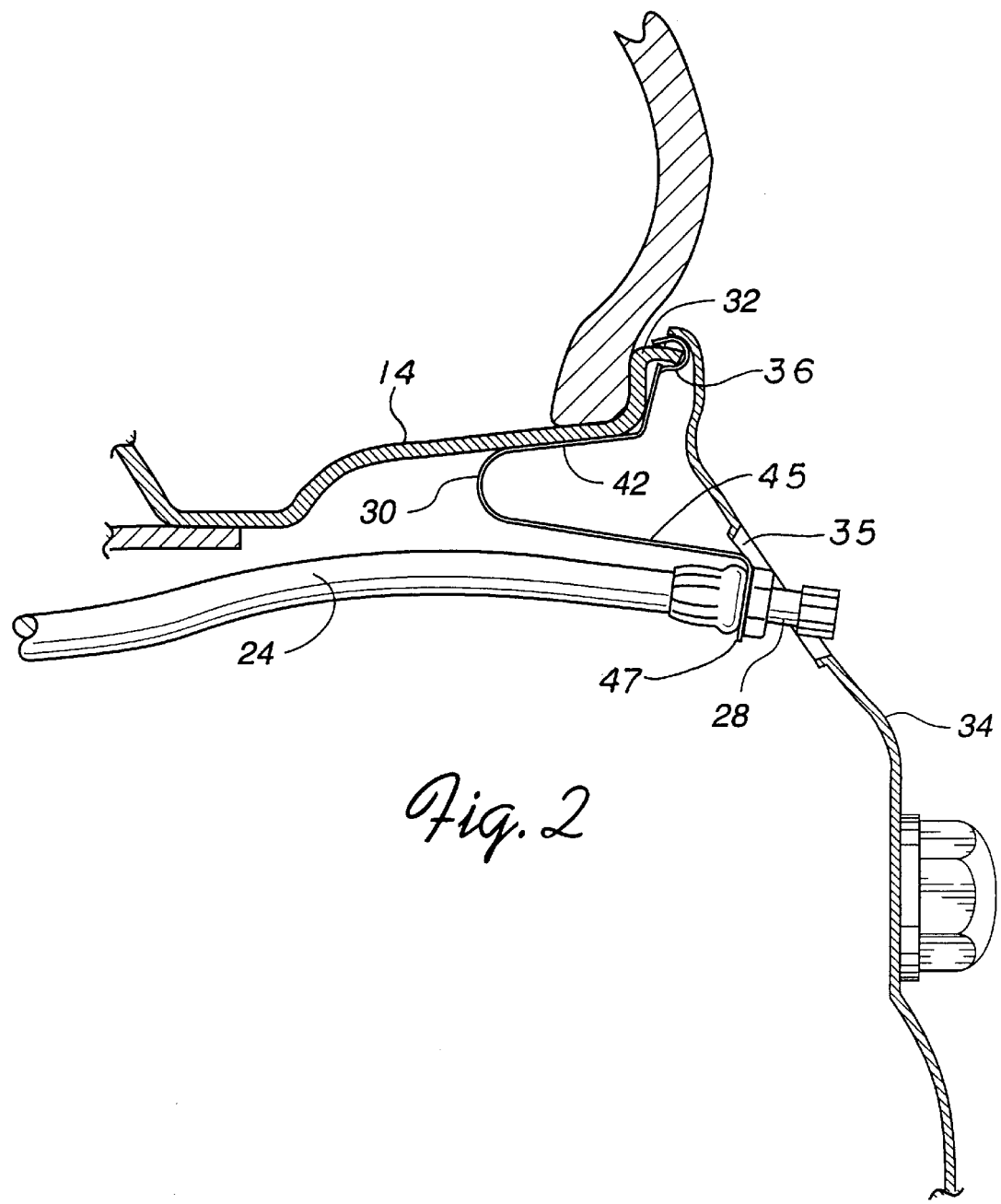
FIG. 2 is substantially a detailed view of a portion of FIG. 1 showing the wheel bracket of the present invention holding a valve extender.

FIG. 2 illustrates how the wheel bracket of the present invention would normally be attached to a vehicle wheel rim. A first end 36 of wheel bracket 30 is attached to an outer edge or lip 32 of wheel 14. A second end 47 of wheel bracket 30 is attached to valve extender 24 so that end 28 may extend out of hole 35 of wheel cover 34. One of the advantages of the present invention is that it does not interfere with the wheel covers. Wheel cover 34 may be mounted and attached to wheel 14 as it normally would and first end 36 is thin enough not to interfere with the wheel cover. Wheel bracket 30 may be installed by pressing or hammering first end 36 on to a wheel rim. It may be removed by prying with a sharp instrument or by twisting.

As seen in FIG. 3, first end 36 of wheel bracket 30 may comprise a substantially semicircular or C-shaped cross section. This shape allows first end 36 to wrap around and engage the edge of most vehicle wheel rims. Teeth or barbs 38 and 40 are provided on first end 36 for engaging the vehicle wheel rim and providing friction. This prevents wheel bracket 30 from accidentally disengaging a vehicle wheel rim.

As seen in FIGS. 2 and 4, wheel bracket 30 comprises a wheel portion 42 for abutting the inner surface of a vehicle wheel. When the vehicle is in motion, wheels 14 and 16 rotate and wheel bracket 30 and any attached objects experiences centripetal acceleration. Wheel portion 42 supports the remaining portions of wheel bracket 30 and any attached object. Wheel portion 42 may be provided in a number of different shapes so that it is contoured to abut a variety of different wheel rims. Wheel portion 42 may be pliable so that a user can shape and contour wheel portion 42. Wheel portion 42 may also comprise holes or lateral grooves at various locations for allowing users to more easily bend and shape the wheel portion to fit a particular wheel. Longitudinal grooves or ridges 43 may be provided on any portion of wheel bracket 30 for stiffening the wheel bracket.

FIG. 5 illustrated the pliable nature of one embodiment of wheel bracket 30. When first end 36 is attached to an outer edge of a vehicle wheel rim, wheel portion 42 may be bent to adapt the wheel bracket to the particular wheel rim. This allows wheel portion 42 to conform and contour itself to the particular wheel rim.

Wheel bracket 30 also comprises a free standing portion which projects away from the vehicle wheel so that objects may be held in a position that is separated by some distance from the vehicle wheel. It is often desirable for objects to be held away from a vehicle wheel. This is the case with valve extenders that must be positioned adjacent to a hole on a wheel cover. In the present invention the freestanding portion may comprise an elbow portion 44 and a straight portion 45. Elbow portion 44 is attached to wheel portion 42 and curves away from the vehicle wheel rim back towards the wheel cover. Elbow portion 44 may be fashioned in a variety of shapes and it may be bent and manipulated so that the position of any object attached to the wheel bracket 30 may be easily changed. In the preferred embodiment, elbow portion 44 is a smooth curve, approximately 170 degrees. However, a sharp bend, such as a V-shape, may also be employed.

Straight portion 45 is attached to elbow portion 44 and it extends outwards towards wheel cover 34. A second end 47 is attached to freestanding portion 45. Second end 47 comprises a means, such as hole 46, for holding objects. For example, hole 46 may receive end 28 of valve extender 24 and a nut may be used to securely attach the valve extender to second end 47. Second end 47 may form a right angle with straight portion 45 so that attached objects will be parallel to straight portion 45.

When a user wishes to check or adjust tire pressure, the user would normally press a gauge or air hose on to end 28. This requires the user to apply some amount of force along the axis of end 28. The force is transmitted through second end 47, straight portion 45, and elbow 44 to wheel portion 42 and first end 36. Wheel portion 42 and first end 36 provide a counter force or supporting force that causes wheel bracket 30 to reach an equilibrium. Thus, when the user presses upon end 28, the user will be able to engage the pressure gauge or air hose.

The present invention is preferably manufactured by stamping sheet steel. Stamping is an efficient and inexpensive method for manufacturing the wheel bracket and it results in a light and durable bracket. Other methods may also be used to manufacture the present invention. Although the preferred embodiment is made of corrosion resistant steel, plastic, fiberglass, and other suitable materials may also be used to make the present invention.

SUMMARY

It may now be seen that the present invention comprises a wheel bracket that may hold objects in a desired position on a vehicle wheel. The wheel bracket holds objects when the wheel is rotating and the wheel bracket provides a counter force when a user presses upon the freestanding portion or an object attached to the freestanding portion. The wheel bracket is light, durable, inexpensive to manufacture, and may be used with a large variety of wheels and wheel covers.

Although the description above contains many specifications, these should not be construed as limiting the scope of the invention but as merely providing illustrations of some of presently preferred embodiments of this invention. For example, the angles and shapes of the wheel bracket may be different and still achieve the objects of the present invention. Thus, the scope of the invention should be determined by the appended claims and their legal equivalents rather than by the examples given.

What is claimed is:

1. A wheel bracket for holding a flexible air-valve extender in position on a vehicle wheel to allow a user to access the extender when a wheel cover is attached to the wheel, comprising:
   (A) a first end for attaching the bracket to an outer edge of the wheel;
   (B) a wheel portion attached to said first end for providing support, said wheel portion having a surface to abut a surface on the wheel;
   (C) a freestanding portion attached to said wheel portion and projecting away from the wheel for supporting the extender in a position separated from the wheel; and
   (D) a second end attached to said freestanding portion for holding the extender,
   wherein the extender is held in a position to allow a user to check and adjust tire pressure when a wheel cover is on the wheel, wherein said wheel portion abuts the wheel and supports said freestanding portion, said second end, and the extender when a user presses on the extender.

2. The wheel bracket of claim 1 wherein said first end comprises a substantially C-shaped cross section, wherein said first end wraps around an outer edge of the wheel.

3. The wheel bracket of claim 1 wherein said first end comprises at least one barb for engaging the wheel.

4. The wheel bracket of claim 1 wherein said wheel portion comprises a flexible material for allowing said wheel portion to be bent to conform to contours of the vehicle wheel.

5. The wheel bracket of claim 1 wherein said free standing portion comprises a flexible material for allowing said free standing portion to be bent to position the valve extender in a desired position.

6. The wheel bracket of claim 1 wherein said free standing portion comprises an elbow for supporting said second end in a position separated from the wheel.

7. The wheel bracket of claim 1 wherein said elbow comprises a flexible material for allowing said elbow to be bent to position the valve extender in a desired position.

8. The wheel bracket of claim 1 wherein said free standing portion comprises a straight portion for supporting said second end in a position near the wheel cover.

9. A wheel bracket for attaching an object to a vehicle wheel and holding the object in a desired position, comprising:
   (A) a first end for attaching the wheel bracket to an edge of the wheel;
   (B) a wheel portion attached to said first portion for abutting an inner surface of said vehicle wheel;
   (C) a freestanding portion attached to said wheel portion for supporting the object in a position separated from the wheel; and
   (D) a second end attached to said freestanding portion for attaching to said object.

10. The wheel bracket of claim 9 wherein said freestanding portion comprises an elbow.

11. The wheel bracket of claim 9 wherein said freestanding portion comprises a straight portion.

12. The wheel bracket of claim 9 wherein said first end comprises a substantially semicircular cross section.

13. The wheel bracket of claim 12 wherein said first end has at least one tooth for engaging the edge of the wheel.

14. The wheel bracket of claim 9 further comprising a flexible material for adjusting the shape of the wheel bracket.

15. A vehicle wheel air-valve system, comprising:
(A) a vehicle wheel, said wheel having an outer edge;
(B) an air-valve extender pneumatically connected to a tire on said wheel for pneumatically communicating with the tire; and
(C) a wheel bracket attached to said wheel for supporting said extender, said wheel bracket comprising:
  (a) a first end for attaching to said edge of said wheel;
  (b) a wheel portion abutting a surface of said wheel for providing structural support to said wheel bracket; and
  (c) a freestanding portion attached to said wheel portion for supporting said extender; and
  (d) a second end attached to said freestanding portion for holding said extender.

16. The vehicle wheel air-valve system of claim 15 further comprising a wheel cover attached to said wheel for protecting said wheel, said wheel cover having a hole, wherein said extender is positioned to allow a user to access said extender through said hole.

17. The vehicle wheel air-valve system of claim 15 wherein said wheel is a dual wheel with an inner and outer wheel, said air-valve extender being pneumatically connected to a tire on said inner wheel, said wheel bracket being attached to said outer wheel.

* * * * *